United States Patent [19]

Kendle

[11] Patent Number: 5,423,394
[45] Date of Patent: Jun. 13, 1995

[54] THREE POINT HITCH FOR HUMMER TRUCK AND OTHER VEHICLES

[76] Inventor: Thomas D. Kendle, 26179 May St., Edwardsburg, Mich. 49112

[21] Appl. No.: 78,636

[22] Filed: Jun. 21, 1993

[51] Int. Cl.⁶ .............................................. B60K 17/28
[52] U.S. Cl. .................................... 180/53.3; 172/439
[58] Field of Search .............................. 180/53.3, 53.1; 280/455.1, 474, 456.1; 172/439, 47, 443, 445.1, 450

[56] References Cited

U.S. PATENT DOCUMENTS

| | | | |
|---|---|---|---|
| 3,145,781 | 8/1964 | Rogler | 172/439 |
| 4,519,623 | 5/1985 | Orthman | 172/439 |
| 4,887,680 | 12/1989 | Nozaka et al. | 180/53.3 |
| 4,940,096 | 7/1990 | Johnson | 172/443 |
| 4,944,354 | 7/1990 | Langen et al. | 172/439 X |

FOREIGN PATENT DOCUMENTS 0521832  5/1940  United Kingdom ............... 180/53.3

Primary Examiner—Margaret A. Focarino
Assistant Examiner—Christopher P. Ellis

[57] ABSTRACT

Three point hitch for Hummer truck, stake truck, pickup truck, farm tractor front mount, or trailer frame. A three point hitch mounted on the rear bumper of a Hummer or pickup, the back of the bed of a stake truck, and braced to the frame or bed determined by mounting height, also adaptable to farm tractor front mount, other vehicles and trailer frames with proper bracketing. The hitch has a pair of lower lift arms and a adjustable top link to allow the mounting of standard three point agricultural equipment. It has a frame assembly with a rock shaft containing a cylinder crank arm and outer crank lift arms, hydraulic cylinder, two drag links and two lower lift arms. It also contains a two inch square receiver for use of any standard two inch towing slider, and a power take-off shaft assembly to power accessories. All moving parts are easily removable from the basic frame allowing free turning radius when used in towing operations.

9 Claims, 12 Drawing Sheets

THREE POINT HITCH FOR HUMMER TRUCK AND OTHER VEHICLES

TECHNICAL FIELD

The invention relates to lifting hitches mountable on HUMMER trucks and others for connecting carriers and implements to the truck. The lifting hitch is a hydraulic operated three point hitch mounted on the rear bumper and braced to the frame of a truck. The frame of the hitch also has a two inch square receiver which allows use of standard two inch square hitch sliders for towing of farm equipment, trailers, and a power take-off shaft to power accessories. With proper brackets, this hitch can also be front mounted on trucks, farm tractors, and mounted on trailer frames.

BACKGROUND OF THE INVENTION

HUMMER trucks are military vehicles which are now available for commercial market and use. Pickup trucks are all-purpose motor vehicles extensively used in agricultural and construction environment for hauling feed, equipment, tools and goods. Farm tractors are slow vehicles extensively used in agriculture, which are now developing a limited need for a front mount three point hitch. Trailers are towable wheeled carrying units. Hitches connected to the rear bumper of the truck are used to couple trailers and implements and some of these hitches can also be used on the front of a farm tractor and mountable on trailer frames. A number of material handling structures and implements are adapted to be connected to three point hitches mounted on tractors and some of these can now be used on trucks and other carriers. A three point hitch includes draft arms connected to lift arms to facilitate the raising and lowering of the implements relative to the tractor. Three point hitches in use with tractors are not readily suitable for mounting on HUMMERS, or pickup trucks or the front of farm tractors. Mounting the three point hitch directly to the bumper and bracing it to the frame makes it easy to install with little stress. With pickup trucks and farm tractors front mount, and trailers some adapting is necessary. The hitch projects rearward of the bumper and features quick pin removable arms for road and trailer towing use, and a power take-off shaft to power light accessories.

SUMMARY OF THE INVENTION

The invention is directed to a three point hitch frame, which includes a two inch square receiver for implement or trailer towing, a power take-off shaft for light accessories, and removable lift and draft arms, with this hitch frame mounting to the bumper of the HUMMER or other trucks. This hitch frame is also secured by frame braces and is adaptable to the front of farm tractors or is usable on a trailer frame. There is a transverse shaft with two outer crank lift arms and at least one cylinder crank arm. There is a hydraulic cylinder connecting the crank arm to the frame. The transverse shaft is mounted on the hitch frame. The cylinder crank arm of the transverse shaft moves with the cylinder stroke, causing the selective up and down movement of the outer lift arms of the transverse shaft (rock shaft). There are adjustable drag links which connect these outer crank lift arms to the lower lift arms, this rock shaft is removable. The lower lift arms have sway chains attached to them and the frame, thus limited the side travel of the arms. The top link, lower arms, drag links and cylinder are all removable, and secured with quick pins and screw chain links. This allows the transverse (rock shaft) arms to be raised or lowered for clearance. Quick pin secured removable arms allow clearance for turning when towing trailers or implements. The frame also has a two inch square receiver to accept a variety of towing hitch sliders and a power take-off shaft to provide power for light accessories.

This three point hitch allows the vehicle to be used for towing and or lifting of many types of agricultural three point hitch pieces of equipment. These include, but are not limited to, grader blades, lift booms, lift forks, disc, bale carriers, sprayers, and other types, as well as trailer equipment and some power take-off equipment. Major suggested uses are, agricultural, construction, military, and forest services.

The hitch uses a standard 20 inch agricultural hydraulic cylinder and can be powered by an electrical hydraulic unit or other means of hydraulic power, separate linear actuator such as the piston and cylinder assembly of a standard 20 inch agricultural cylinder is connected to the crank arms and the frame members. The piston and cylinder assemblies are supplied with fluid under pressure from a pump. The control valve is used to direct the flow of hydraulic fluid, under pressure, to and from the cylinder assembly. Thereby selectively raising or lowering the outer crank lift arms. A control link is pivotally connected to the top of the frame and to any three point carrier such as a lift boom. The outer crank lift arms are pivotally connected to opposite portions of the carrier so that the carrier is selectively raised or lowered in response to the raising and lowering movements of the outer crank lift arms, drag links, and lower lift arms.

The separate upright pivotal connections couple the outer crank lift arms to opposite ends of the shaft. The lower arms are all removable with quick pin connectors and screw chain links, and, therefore, when not in use, the lift does not project any substantial distance rearward of the bumper.

The power take-off shaft allows accessory use and can be hydraulic driven or shaft driven from an outside source or can be directly powered.

The three point hitch of the invention, will enable, not only farmers, ranchers, military, forest service, and construction people, but any individual, to get more use out of their HUMMER, pickup truck, trailer, or tractor for many basic chores such as blading and leveling roads, cultivations, discing, plowing and row crop equipment, pulling tractor equipment, picking up and transporting spray tanks, picking up and transporting large round hay bales for feeding purposes or organizing in a feed lot or field, and operating light power equipment such as post hole augers and spray pumps, fertilizer spreaders, as well as towing capabilities.

Farmers and ranchers use tractors with three point hitches for many chores. Many farmers have had to purchase additional tractors for different types of work that the three point hitch or power take-off shaft will take care of. For example: when a farmer needs to feed his cattle in the winter in cold climates, he must first go out and try to get his tractor started, after being plugged in all night. When it does start, he must let it run and warm up 10–15 minutes. Then he must drive out to the hay and try to pick up a hay bale with the tractor and a special piece of equipment for moving hay bales. A farmer will be able to use small equipment without having to use a tractor. There will be no need to go out and warm up a tractor to move feed out to the animals or do other small jobs. The farmer will not have to sit in a noisy, cold tractor—but will instead be able to use a comfortable, warm, clean, quiet HUMMER or pickup truck to do many chores that now need to be done on the tractor.

The three point hitch of the invention can be mounted onto any HUMMER with a back bumper or any standard size pickup, or larger truck, such as a one-ton or even larger truck. It can also be adapted to the front of a farm tractor or a trailer for limited use. It will allow an individual to hook up to any light three point hitch equipment. It takes only six bolts to install it on a HUMMER'S existing holes in the bumper and frame. You simply remove the six bolts and replace them with the hitch and attach with one-half inch longer bolts. To mount to a pickup truck, trailer, or farm tractor requires some adapting. The hitch does not have to be removed when not in use since the arms are removable and the base frame has a trailer towing hitch receiver built into it and a power take-off shaft. The truck three point hitch is a faster, safer, and easier method of hook-up of an implement for doing many basic chores, or transporting equipment, which now requires the use of a tractor.

Additional advantages of the three point hitch mounted on the rear of a HUMMER or pickup truck are embodied in the following detailed description of a preferred embodiment of the invention and accompanying drawings.

DESCRIPTION OF PREFERRED EMBODIMENT

Figure 1:
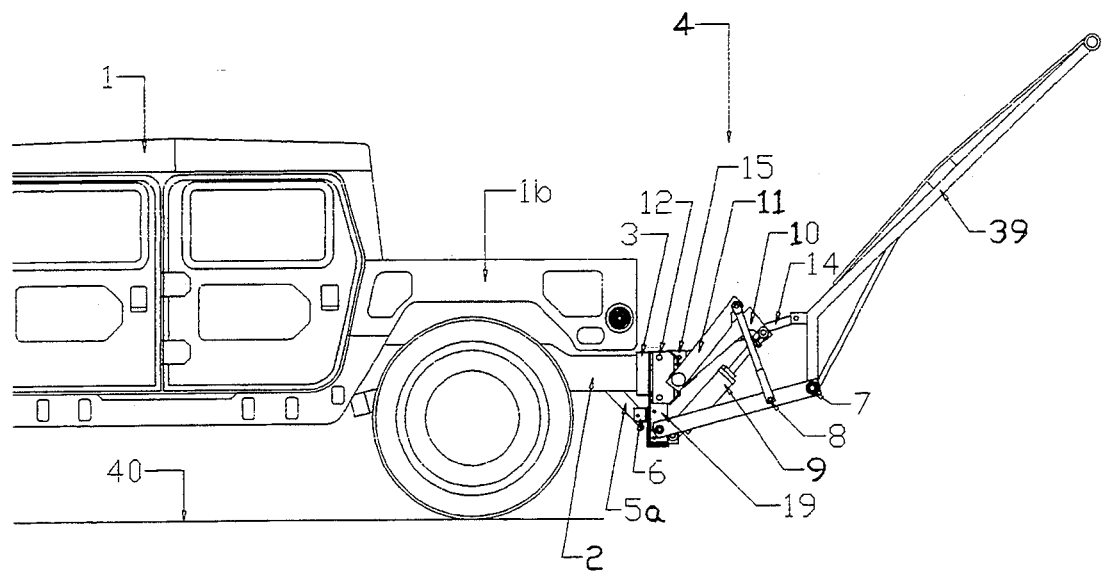
FIG. 1 is a side view of the HUMMER truck and the three point hitch of the invention connected to a lift boom in the intermediate position.
Figure 2:
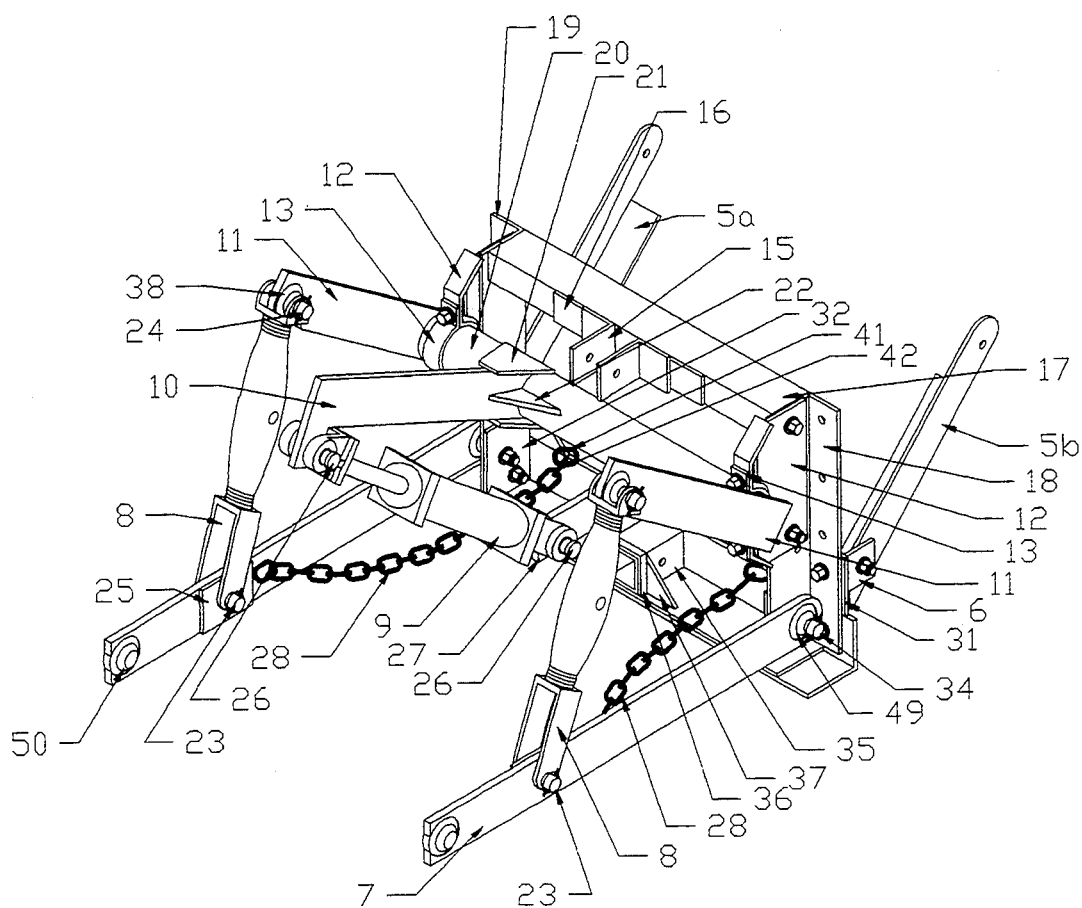
FIG. 2 is a isometric view of the three point hitch.
Figure 3:
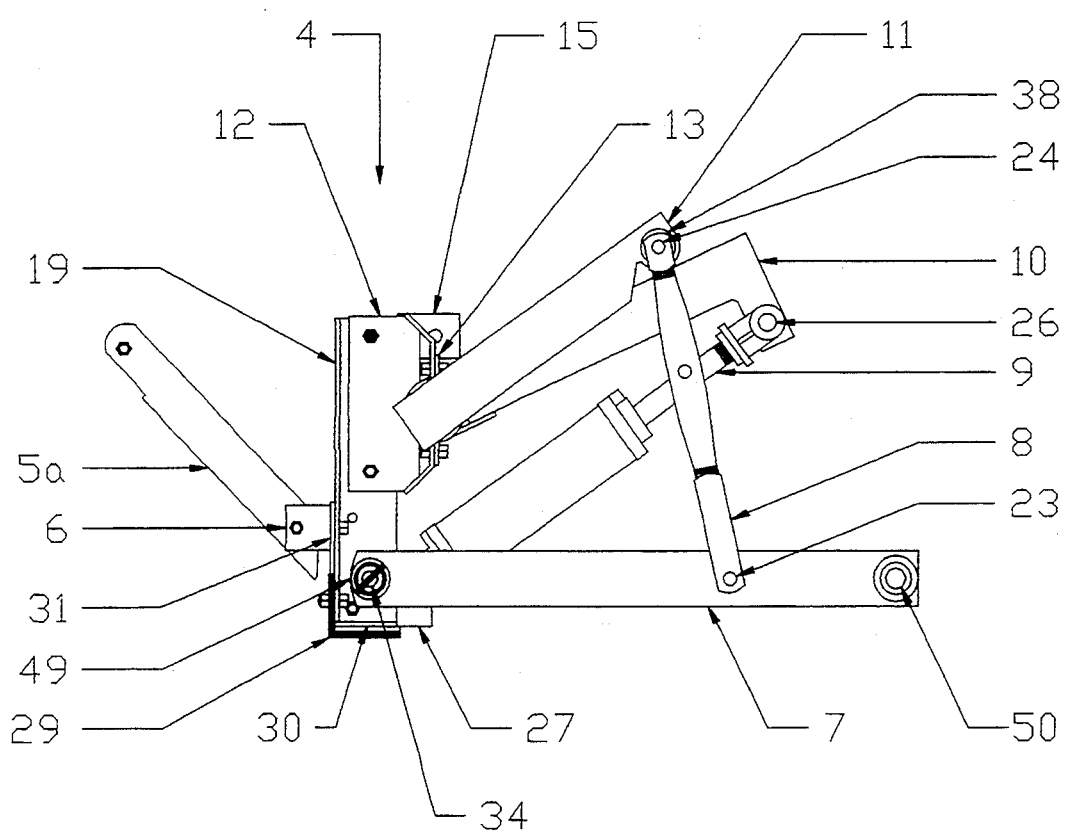
FIG. 3 is a side view of the three point hitch.
Figure 4:
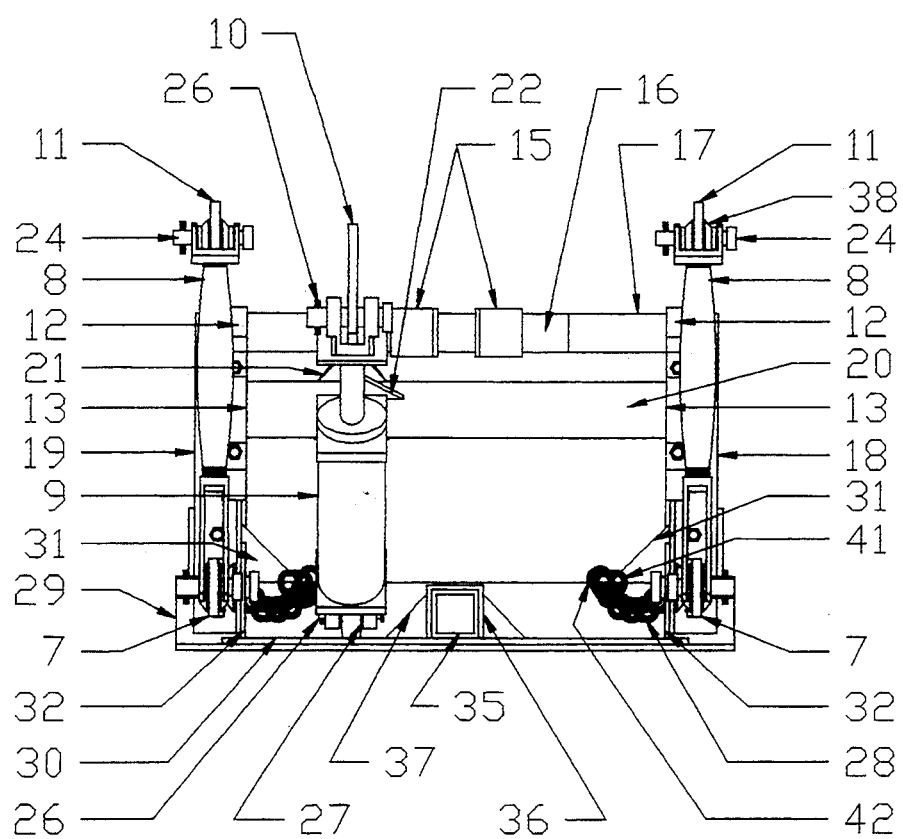
FIG. 4 is a front view of the three point hitch.
Figure 5:
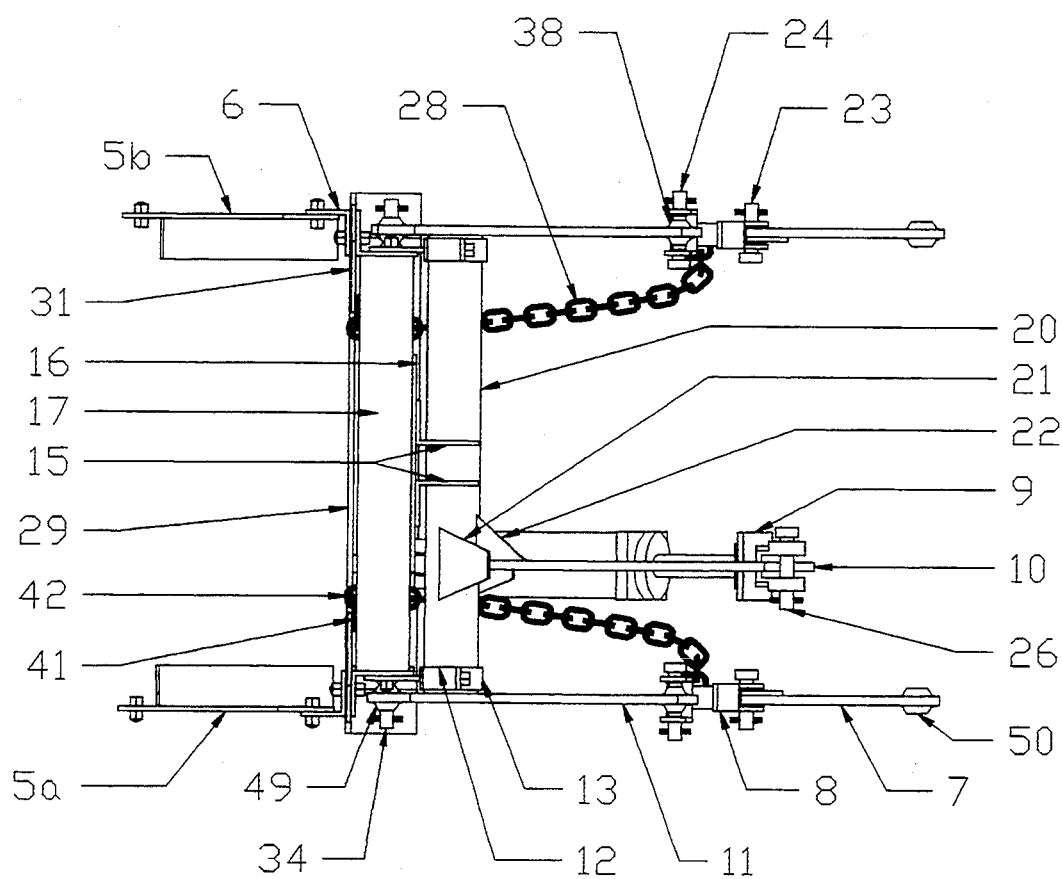
FIG. 5 is a top plan view of the three point hitch.
Figure 6:
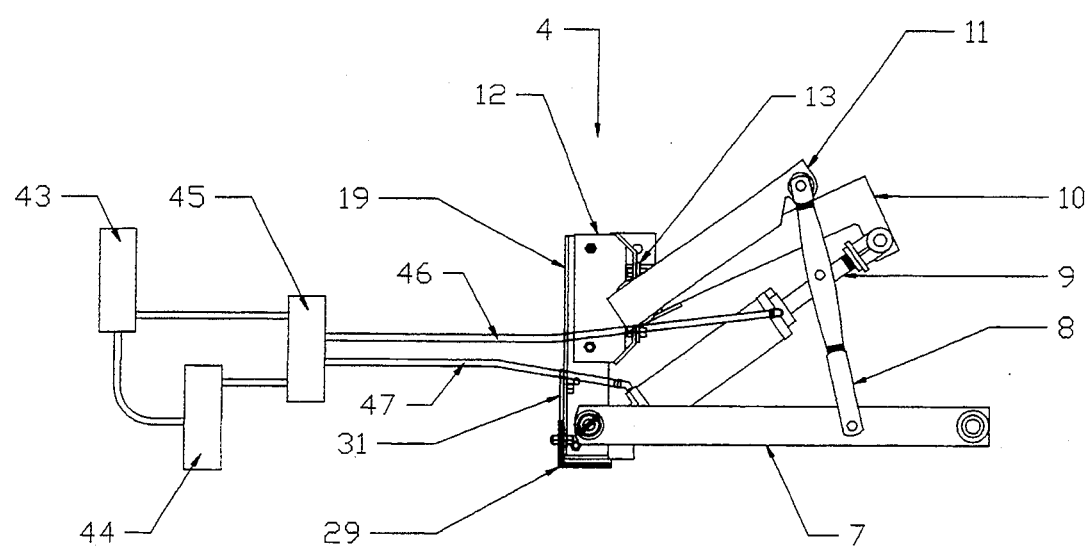
FIG. 6 is a side view of the three point hitch showing the hydraulics.

Referring to FIG. 1—there is shown the rear of a motor vehicle, such as a HUMMER truck 1 having an open top box 1B. Box 1B is mounted on a pair of rearwardly directed generally horizontal frame rail 2 and a rear bumper 3. Frame rails are conventional longitudinal box beams 2 and the rear bumper is also a conventional box beam 3. A transverse rear box beam bumper 3 is secured to the rear end portions of the frame 2. The truck 1 is illustrative of a type of vehicle usable with the three point hitch of the invention indicated generally 4 in figure 1 of the invention. Other types of vehicles, trailers, and farm tractors can be equipped with the three point hitch 4.

A lift boom assembly indicated generally at 39 is connected to the hitch 4. This is attached by a removable top link 14 and two lower lift arms 7 by pins, snap links, or quick pins, other types of product carriers, buckets, and blades can be connected to hitch 4 and used to transport products and scrap gravel, snow, ice, dirt, manure and the like from ground surface 40, a floor and like surfaces.

Figure 8A:
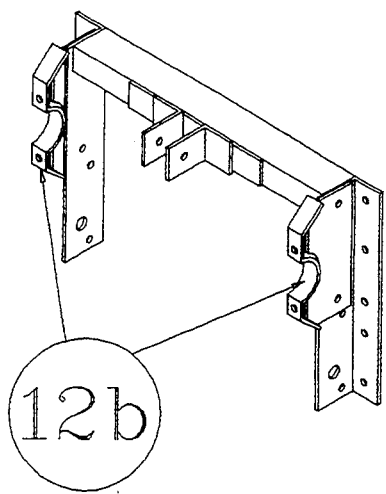
FIG. 8A and FIG. 8B are a isometric view showing two different types of saddle assemblies.
Figure 8B:
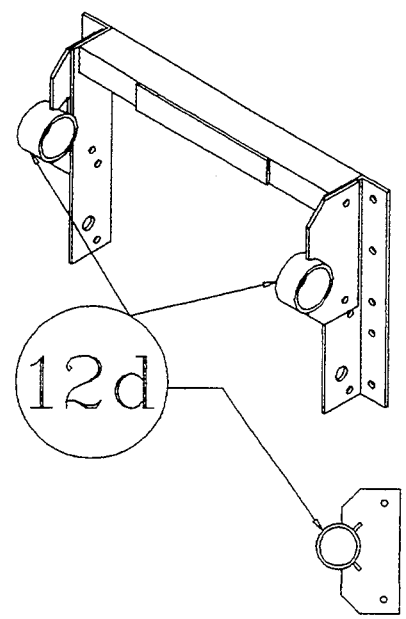
Figure 9:
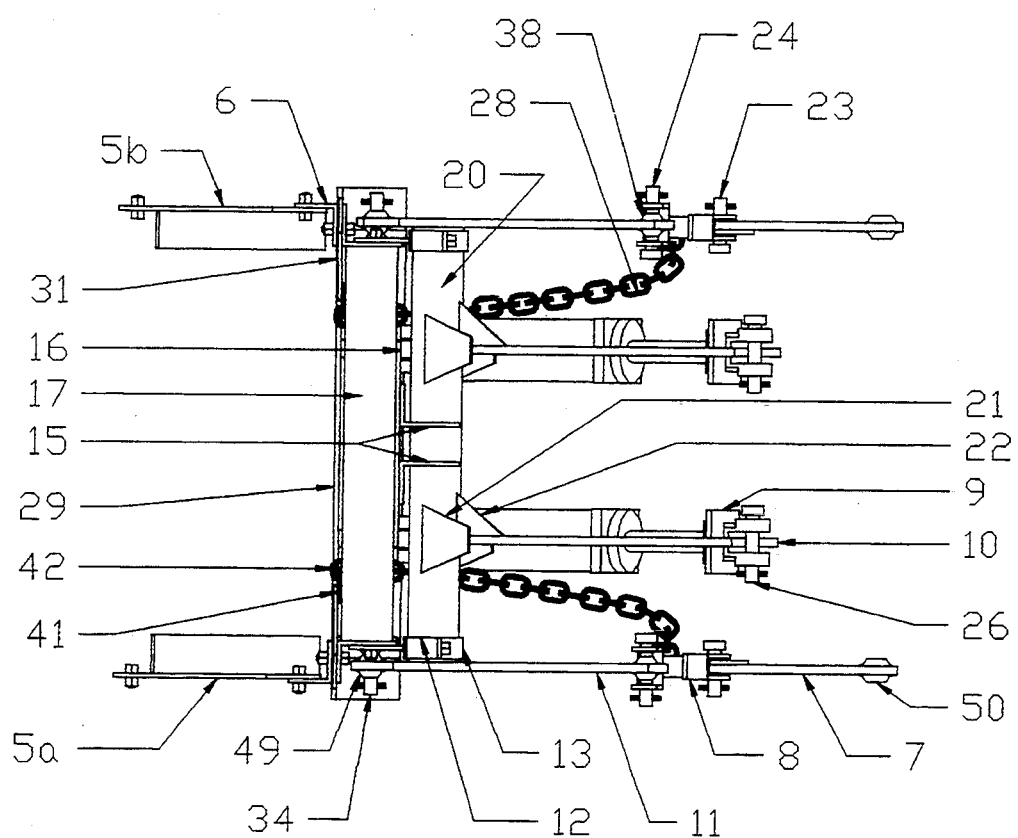
FIG. 9 is a top plan view of the three point hitch like FIG. 5 except it shows dual hydraulic cylinders actionation.
Figure 10:
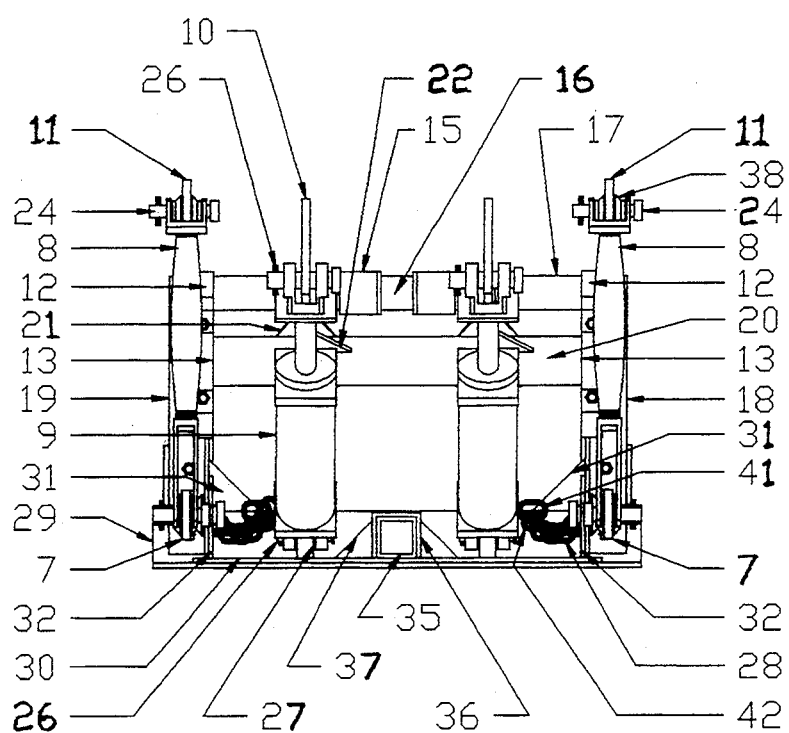
FIG. 10 is a front view like FIG. 4 of the three point hitch except it shows dual hydraulic cylinder actionation.
Figure 11:
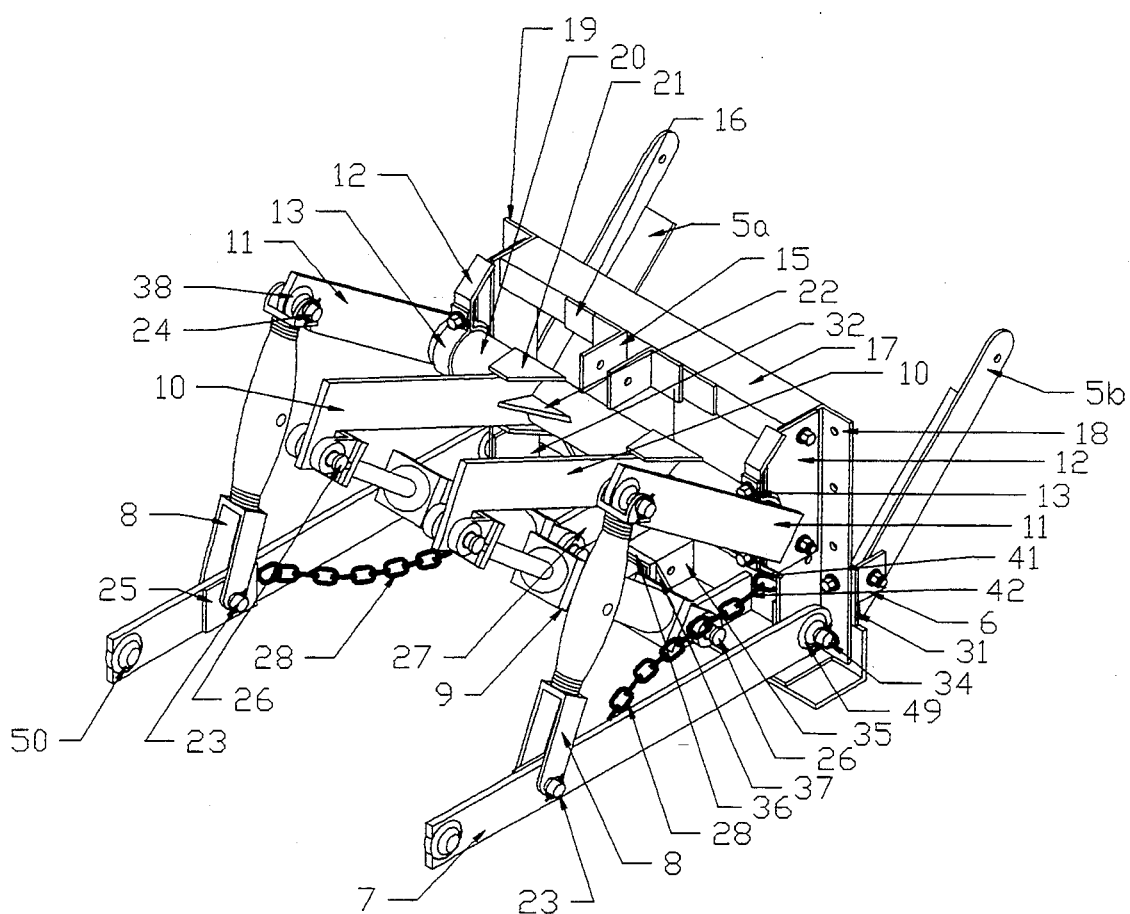
FIG. 11 is a isometric view of the three point hitch like FIG. 2 except it shows dual hydraulic cylinder actionation.
Figure 12:
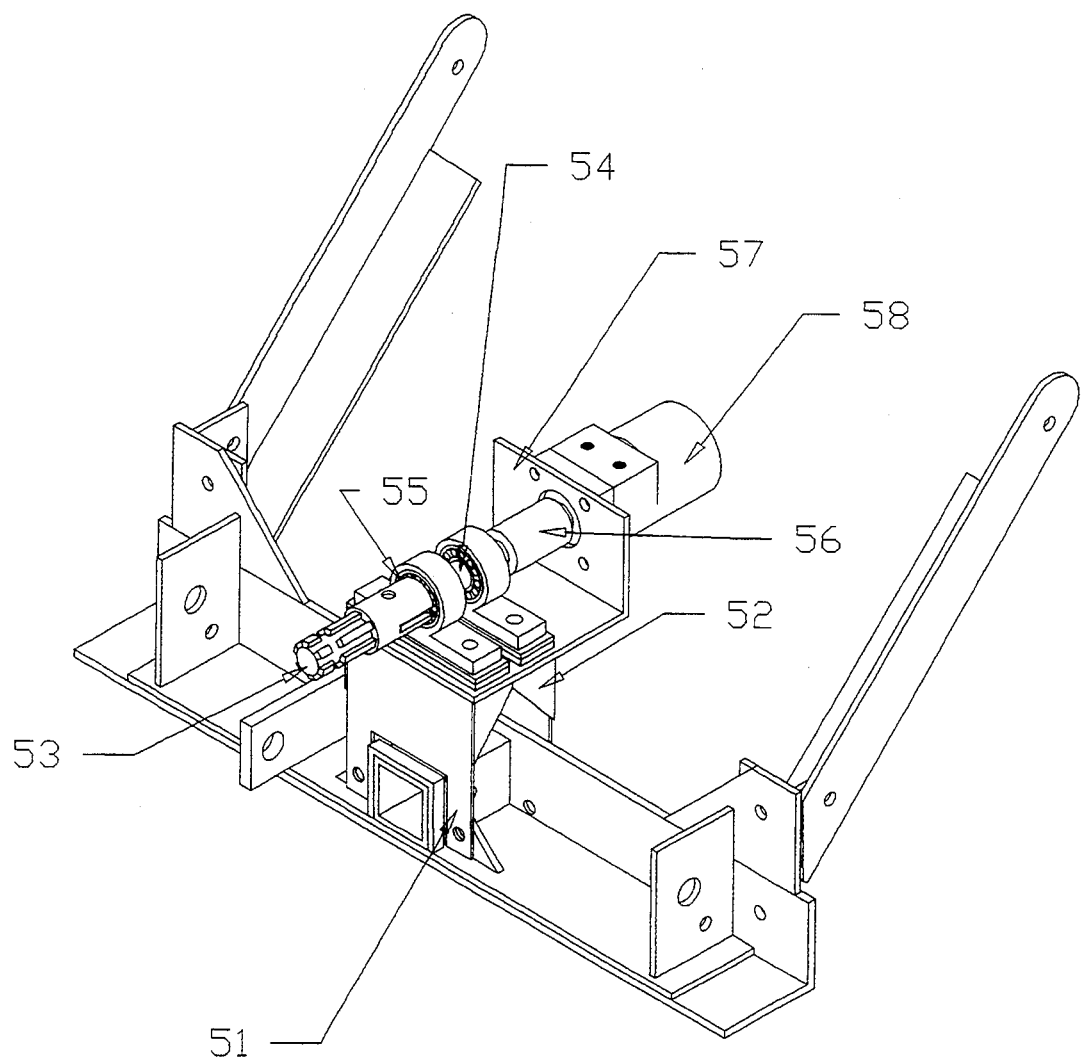
FIG. 12 is a isometric view showing a power take-off shaft bolted onto the hitch frame.

Referring to FIGS. 2, 3, 4, 5, 6, 9, 10, and 11 the hitch has a main frame made up of two side angles 18 and 19, one top spreader component 17, which has a stiffener plate 16 and two top link mount pieces 15 which are all welded together. The top spreader is welded to the two side angles 18 and 19. On both side angles are bolted rock shaft mount plates with half saddles FIG. 8A 12B, these have bolted removable outer saddle half's 13. There is also a full saddle assembly FIG. 8B 12D. These saddle assemblies house and support the transverse rock shaft 20 which is the means of transferring the cylinder 9 lift power through the rock shaft cylinder crank arm 10 to the rock shaft 20. This cylinder crank arm is welded to the rock shaft and is reinforced by two fish plates 21 and a gusset 22 for angular support: double cylinder crank arms 10 can be used for the dual hydraulic cylinder 9 strength option (FIG. 9, 10, & 11). This power is then transferred to the rock shaft outer crank lift arms 11. These arms 11 welded to the end of the rock shaft 20. The outer crank lift arms 11 have an oscillating bushing 38 welded in the lift end which allows movement when connected by pin 24, and the drag link 8 (an adjustable link), which transfers lift power to the removable lower lift arms 7. These lower lift arms have welded oscillating bushings on both ends 49 and 50, a welded wear plate 25 at the lift eye with a pin 23 and a sway chain 28 welded near the lift eye. This lift arm 7 is used to attach three point hitch equipment and is attached to the frame base lower angle riser plates 32, 33, and the angles 18 and 19 by bolt mount pins 34. The lower frame is made up of a angle iron base 29 with a welded stiffener plate 30, two welded lower frame angle base upper gussets 31, two side angle 18 and 19, two lower frame angle base risers 32 and 33, two welded chain links 41, and two screw chain links 42, which attach the sway chains. There is a cylinder lower mount plate 27 which is pinned 26 to the cylinder 9 and provides the stationary base for the prime mover power lift force 9. This lower frame angle base 29 with all of its welded components is bolted to the two frame angles 18 and 19 at their lower extremity.

Figure 7:
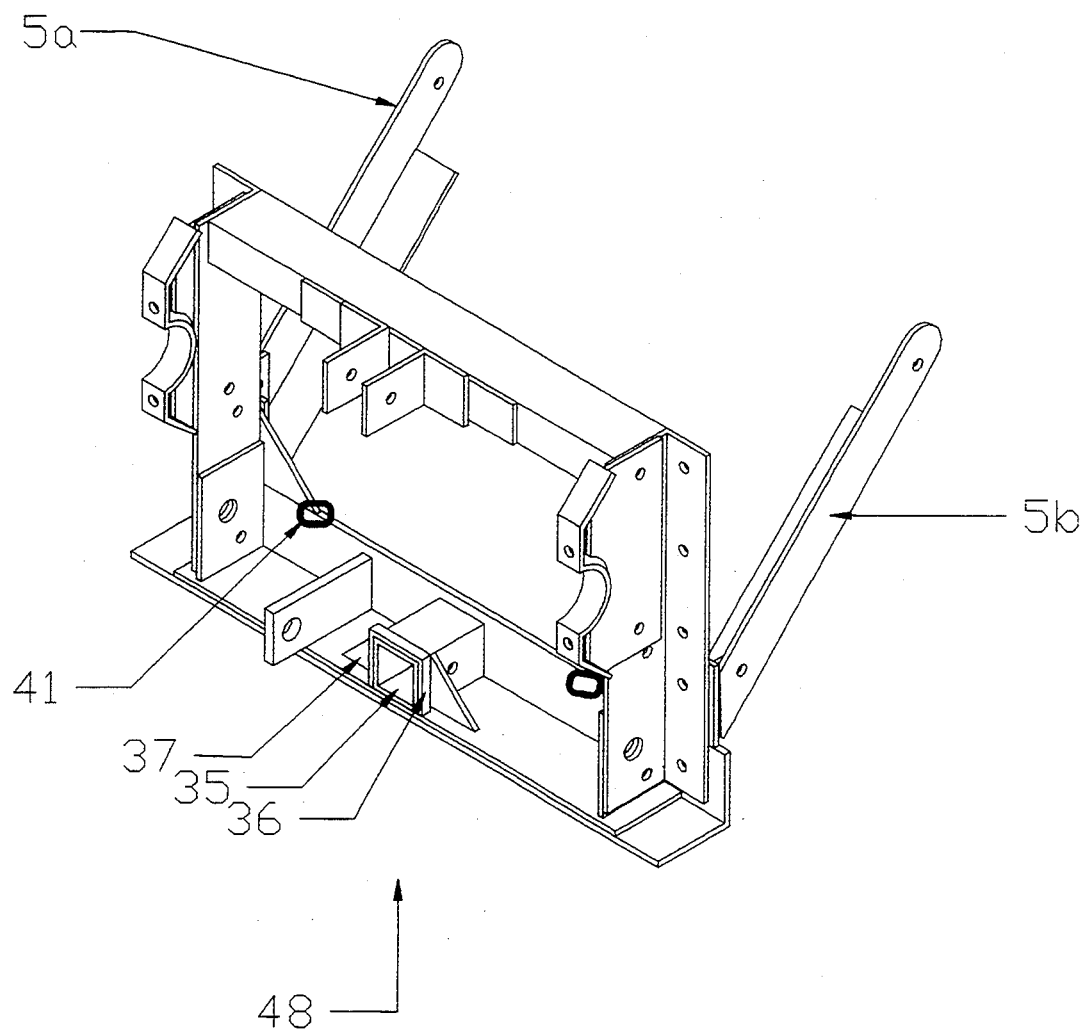
FIG. 7 is the base frame assembly with all arms removed and towing receiver in view.

This lower base assembly FIG. 7 of the hitch 48 also contains a two inch square receiver tube 35 which is drilled for a pin. This tube has a reinforced outer stiffener band of metal 36 and two gusset plates all welded in place, providing a strong towing hitch base for use of many types of two inch hitch sliders. The hitch also has a pair of brace arms 5 and 5B to strengthen its mounting.

Returning to FIG. 6, the cylinder assembly 9 is supplied with hydraulic fluid under pressure from a pump 43 connected to a tank 44 and valve 45. The pump operates to draw hydraulic fluid from the tank 44 and deliver the fluid to valve 45 which is connected with lines 46 and 47 to opposite ends of the hydraulic cylinder 9 whereby the operator of the vehicle can selectively expand or contract the cylinder assembly. Pump 43 can be driven by the motor of the vehicle or a separate electric motor. The valve 45 can be a hand operated spool valve located in the cab of the vehicle to provide convenient access to the operator of the vehicle. Valve 45 can be a solenoid operated valve controlled with electric switches or a manual valve controlled by the operator of the vehicle.

The three point hitch has a pair of lower lift arms 7 and a top controllable link 14 which extend rearward from the truck rear bumper 3 and hitch frame assembly 48, and are removable. It has a base frame assembly 48 which is bolted to the truck bumper 3 and braced 5 and 5B. There is a transverse rock shaft 20 with two outer crank lift arms 11 and one or two cylinder crank arms 10. There is a hydraulic cylinder or two 9 connecting the cylinder crank arm 10 to the frame assemble 48. This transverse rock shaft 20 is mounted on the frame by two rock shaft mount plate saddle assemblies 12. The cylinder crank arm 10 of the rock shaft 20 moves with the cylinder 9 stroke, causing the selective up and down movement of the outer rock shaft 20 crank lift arms 11.

There are adjustable drag links 8 which connect the rock shaft outer crank lift arms 11 to the lower lift arms 7. This rock shaft 20 is also removable by bolts. The lower lift arms 7 have sway chains 28 attached (welded) to them and attached to a welded link 41 on the frame assembly 48 by a screwable chain link 42, thus limiting the side travel of the lower lift arms 7. The top link 14, lower arms 7, drag links 8, and cylinder 9 are all removable and secured with quick pins 23, 24, and 34 and/or screw chain links 42. This allows the transverse rock shaft arms 10 and 11 to be raised or lowered or the rock shaft 20 to be unbolted from the rock shaft mount plates 12 or removed as an assembly by unbolting mount plates 12. Quick pins 34 secure removable lower arms 7 allowing more clearance for turning when towing trailers or implements.

The frame assembly 48 also has a two inch square receiver 35 to accept a variety of towing hitch sliders and a power take-off shaft 54 with a splined end 53, pillow block bearings 55, and a mounting base 51 with corner gussets 52, coupler 56, hydraulic motor mount plate 57 and hydraulic motor 58.

This three point hitch allows the vehicle to be used for towing and or lifting of many types of agricultural three point hitch pieces of equipment. These include, but are not limited to grader blades, lift booms, lift forks, disc, and others as well as trailer type equipment. Major suggested uses: agricultural, construction, military and forest service. The hitch uses a standard 20 inch agricultural hydraulic cylinder and can be powered by an electrical hydraulic unit or other means of hydraulic power.

While there have been shown and described a preferred embodiment of the three point hitch of the invention mounted on the rear bumper of a HUMMER or pickup truck and braced to the frame or bed, it is understood that changes, modifications, and arrangements of structure as well as parts can be made by those skilled in the art without departing from the invention. It is also understood that the uses of a second hydraulic cylinder across from the first one is possible and would increase lifting strength and that a power take-off (PTO) shaft can be bolted into the hitch and driven by fuel engine, line shaft, or hydraulic motor. The invention is defined in the following claims.

I claim:

1. A three point hitch connected to the front or back of a vehicle for connecting an implement thereto, the hitch comprising:

a main frame including two side angles, a top spreader component and a lower frame angle base component; said main frame being of a flat, square configuration so as to be easily mountable on a bumper of said vehicle;

said hitch further comprising: a pair of lower lift arms connected to the main frame, a pair of adjustable drag links connected to said lift arms, a controllable top link, a pair of mount pieces for mounting said top link to said main frame, a transverse rock shaft including at least one cylinder crank arm and two outer crank lift arms, at least one hydraulic piston and cylinder assembly connected to said at least one cylinder crank arm, a two inch square receiver to accept a removable towing drawbar and a power take-off shaft built into said main frame;

said top link being adjustable in length and said connections for said lower arms, said drag links, said top link and said at least one piston and cylinder assembly including quick pin connection means for allowing quick assembly and disassembly thereof, and further allowing more clearance during turning when towing said implement.

2. The hitch of claim 1, wherein said vehicle is a tractor.

3. The hitch of claim 1, wherein said vehicle is a truck.

4. The hitch of claim 3, wherein said truck is a HUMMER truck.

5. The hitch of claim 1, wherein the piston and cylinder assembly includes a cylinder connected to said main frame, a movable piston located within the cylinder and a piston rod connected at one end to the piston, and at the other end to the at least one cylinder crank arm.

6. The hitch of claim 1, wherein said rock shaft is disposed generally horizontally and is used to transfer linear motion to rotary motion and said rotary motion back to further linear motion.

7. The rock shaft as defined in claim 6, wherein said main frame includes mount plate bearing assemblies attached thereto for rotatably receiving said rock shaft.

8. The hitch of claim 1 further including a pair of brace members attached to said main frame to add support and strength to the mounting of said hitch.

9. The hitch of claim 1 further including sway chains to steady said implement during operation thereof.

* * * * *